June 13, 1961  H. W. BOYLAN  2,987,981
ADJUSTABLE GRILLE
Filed Sept. 15, 1958  3 Sheets-Sheet 1

INVENTOR.
Henry W. Boylan
BY George E. Johnson
ATTORNEY

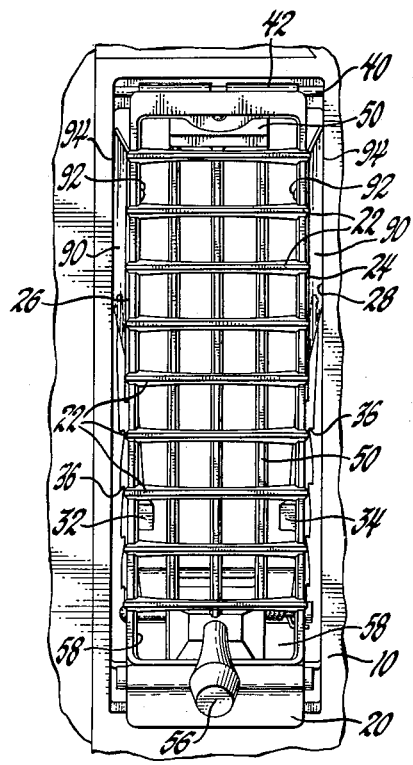

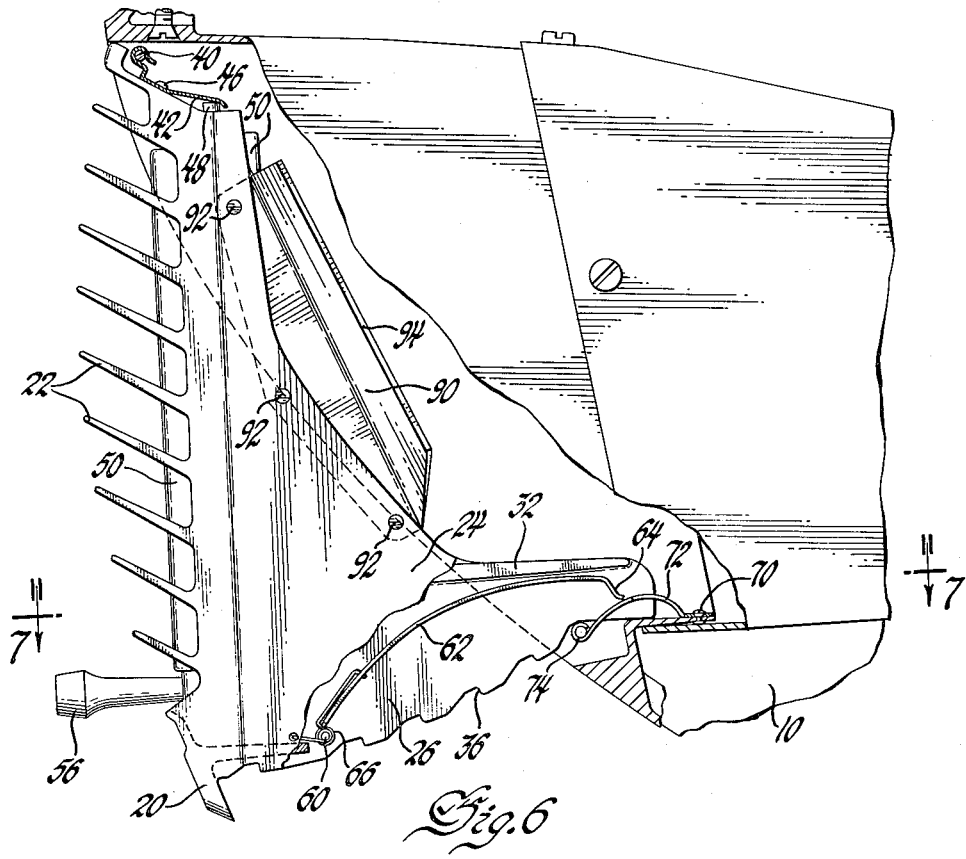
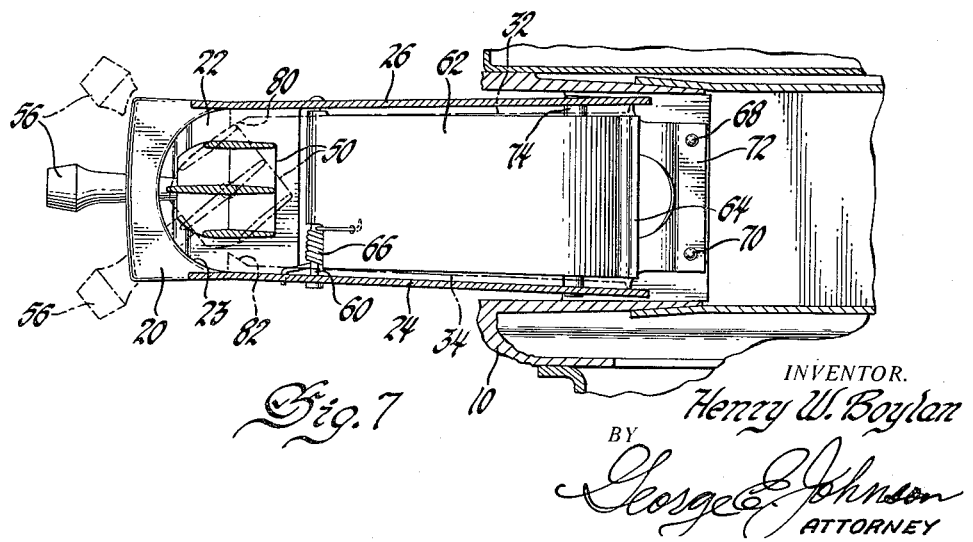

United States Patent Office 2,987,981
Patented June 13, 1961

2,987,981
ADJUSTABLE GRILLE

Henry W. Boylan, Flint, Mich., assignor to General Motors Corporation, Detroit, Mich., a corporation of Delaware
Filed Sept. 15, 1958, Ser. No. 761,137
3 Claims. (Cl. 98—2)

This invention relates to adjustable grilles and more particularly to grilles whereby fluids such as air may be discharged from ducts of pressure systems in selected directions and into enclosures such as the passenger compartment of an automobile.

In the directing of ventilation air or cooled air into a compartment by force such as by blower or by virtue of the movement of a vehicle, it is essential to discharge the air in such directions as to be most comfortable for the individuals therein. A device of this nature for controlling air discharge openings located at the opposite ends of an automotive instrument panel is disclosed in the United States Patent 2,039,403, granted May 5, 1936, in the name of L. H. Gillette. It has now been found that the conformation and exposed surface inclination of modern automobile instrument panels are such that a simple and rugged, as well as convenient and easily accessible, form of grille device may be utilized permitting desirable adjustment for the air discharge direction and, at the same time, provide rattle-free construction as well as a pleasing appearance.

An object of the present invention is to provide an improved adjustable grille for mounting in a panel opening and by means of which the discharge direction of fluid emanating from the opening may be varied.

To these ends, a feature of the present invention comprises a main frame carrying substantially parallel vanes which frame is adjustable on one axis with respect to a support such as an instrument panel and having a sub-frame with a second set of vanes rotatable on the main frame around a second axis, the arrangement being such as to permit convenient vertical and horizontal adjustment for the fluid discharge.

The above and other important features of the invention will now be described in detail in the specification and then pointed out more particularly in the appended claims.

In the drawings:

FIG. 3 is an elevational view of the adjustable grille in the panel looking in the direction of the arrows 3—3 in FIG. 2;

FIG. 4 is a sectional view of structural details as seen looking in the direction of the arrows 4—4 in FIG. 2 and as drawn to a still larger scale;

FIG. 5 is a sectional view looking in the direction of the arrows 5—5 in FIG. 2 and drawn to a larger scale;

FIG. 6 is a view similar to that of FIG. 2 but with the vanes of the adjustable grille swung away from the instrument panel to such an extent as to permit removal of the grille by detaching it from its pivoted support; and FIG. 7 is a sectional view taken along the line 7—7 of FIG. 6.

It will be appreciated that in automobile use cool air being introduced into the passenger compartment should be directed upwardly; that is, into the upper zone of the passenger compartment and not at the feet of the passengers. It is also obvious that heated air being introduced should be directed to a low zone of the passenger compartment from which the air will rise. If air is being introduced merely for ventilation purposes, it should be introduced in more nearly a horizontal plane and sometimes directly upon the persons occupying the passenger compartment. Regardless of whether the grilled device serves as an outlet for an air conditioning system, a heating system or a ventilating system, it is advantageous that the passengers be enabled to direct the air as best suits their individual preferences under changing conditions of weather. This aim is admirably achieved in the use of the grille device herein described.

Figure 1:
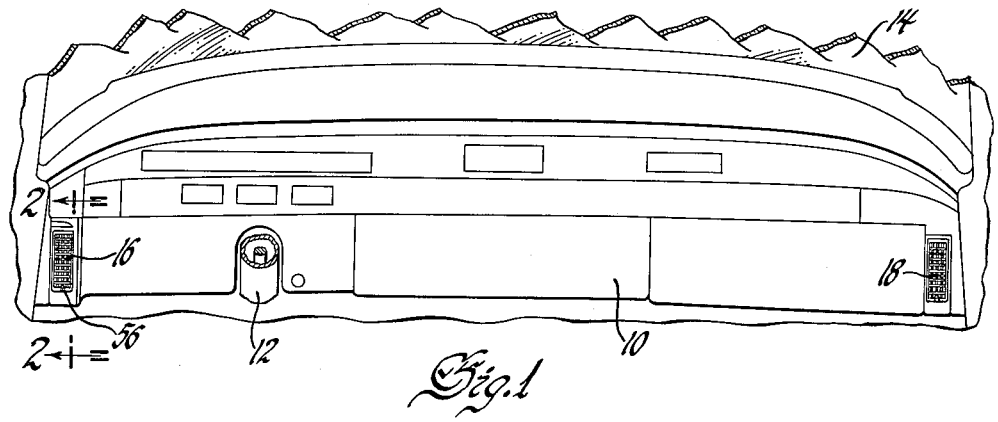
FIG. 1 is an elevational view of an instrument panel at the front end of a passenger compartment in an automobile in which panel two adjustable grilles are mounted.

In FIG. 1, an instrument panel 10 is shown having a conventional steering column 12 as well as a windshield 14. At opposite ends of the panel 10 are installed two adjustable air discharge grilles 16 and 18. These devices are substantially similar and, for that reason, only one, or the left-hand grille 16, is herein specifically described.

Figure 2:
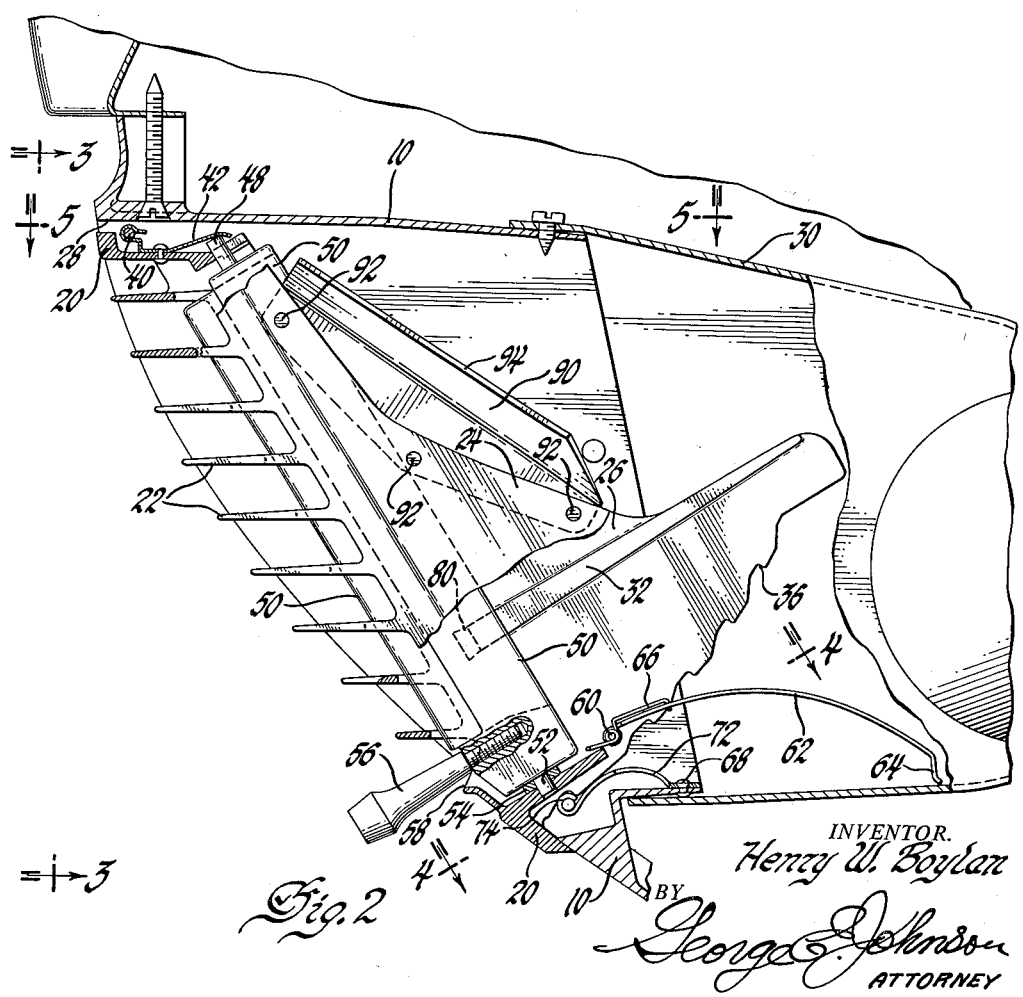
FIG. 2 is sectional view drawn to an enlarged scale and showing one of the grilles positioned flush with the instrument panel exposed surface and as seen looking in the direction of the arrows 2—2 in FIG. 1.

The outlet or grille 16 includes a main frame 20 seen in FIGS. 2 and 3 as of substantially rectangular configuration. Integral with the main frame is a series of substantially parallel vanes 22 as well as two side walls 24 and 26 which extend into an air duct formed in the cowl of the automobile. The exposed edges of the vanes 22 are semi-circular. The inner edge of each vane is contoured as shown at 23 in FIG. 7. The panel 10 defines an opening 28 which is adapted to be controlled by the grille device and the ductwork for supplying air to be discharged from the opening 28 is indicated at 30. The side walls 24 and 26 closely conform with the side walls of the opening 28. It will be noted that the side wall 26 bears a strengthening rib 32 and that the side wall 24 has a strengthening rib 34. The bottom edge of the side wall 26 bears detent notches 36 and the same is true with respect to the side wall 24 as will be understood.

The panel 10 is drilled to receive the ends of a shaft 40. This shaft is adapted to serve as the main pivot for the grille and a spring member 42 is riveted as at 44 and 46 (FIGURE 5) to the top wall of the main frame and is so formed that one end provides two loops partially surrounding the shaft 40 as a hinge. The other end of the spring member 42 bends downwardly and into contact with the end of a trunnion 48 of a sub-frame 50. The trunnion 48 passes upwardly through the top wall of the frame 20 and is journaled in the latter. The lower end of the sub-frame 50 has an integral trunnion 52 which is journaled in the frame 20 on the same axis as the trunnion 48. It will be seen from this that the shaft 40 presents a first axis about which the grille device may be rotated in a vertical plane and that the trunnions 48 and 52 represent a second axis about which the sub-frame 50 may be rotated. A washer 54 is interposed between the lower end of the sub-frame 50 and the main frame 20 to act as a step bearing.

A handle 56 is threaded into the lower end of the sub-frame and it extends through an opening 58 formed in the main frame. This opening 58 is slightly elongated in a horizontal direction to permit swinging of the handle 56 and rotation of the sub-frame 50 on its trunnions.

Piercing the lower portions of the side walls 24 and 26 is a pin 60 upon which is mounted or pivoted one end of a lower curved wall plate 62. The other end of this wall plate bears a curved end 64 adapted normally to rest upon the lower wall of the duct 30 as seen in FIG. 2. A coiled spring 66 is mounted on the rod 60 in such a way as to bias the curved wall 62 downwardly against the wall of the duct 30 to maintain a seal.

Rivets 68 and 70 are utilized to hold a spring plate 72 to the lower wall of the frame 10 and the free ends of the spring member 72 (which is U-shaped) are looped as at 74 for engagement in the detent notches of the walls 24 and 26.

Assuming that air is being forced from the duct 30 into the passenger compartment, that air will be diffused and directed by the vanes 22 as well as the vanes of the sub-frame. Changing the direction of the air may be done by manual manipulation of the handle 56. If the latter is pulled outwardly and downwardly from the panel 10 and to a selected extent, the vanes 22 will direct the air upwardly at an angle corresponding to that extent. If the handle is swung horizontally, the vanes of the sub-frame 50 will direct the air to either side. If the grille device is pulled outwardly from the panel and toward its position, as illustrated in FIG. 6, the curved wall 62 closes off the duct at that area necessitating that the air be discharged only by way of the passages between the vanes. Any required intermediate position of the grille with respect to the panel may be maintained by the detent arrangement provided in the use of the spring member 72.

FIG. 7 shows how rotation of the handle 56 about the trunnion axis would change the direction of the air discharge to the right or to the left, and it will be noted that portions or shoulders 80 and 82 formed on the main frame side walls act as stops determining the extent of rotation. These shoulders are located at the ends of the strengthening ribs 32 and 34 respectively. In FIG. 6, the curved end 64 of the bottom sealing plate 62 is shown as withdrawn outwardly from over the spring plate 72. This position is had only upon installation and removal of the grille device from the panel 10. In use the lip 64 is not drawn further than the edge of the spring member 72 where the rivets 68 and 70 are located.

Affixed to each of the side walls 24 and 26 is a spring plate 90. Three rivets 92 are utilized for the joinder. Each plate 90 has a linear flange 94 extending outwardly and frictionally engaging that portion of the panel 10 which defines one side of the air discharge opening. These two plates 90 with their flanges 94 not only prevent misdirection of the air, but also prevent rattling.

The handle 56 is out of the way regardless of the selected positions of adjustment for the grille device as modern cars have an out-of-the-way corner where the down and forward sloping dash panel intersects the body work forward of the front door. It is in this corner where the handle 56 may advantageously, but not necessarily, be located.

I claim:
1. An adjustable grille for mounting in the opening of a panel, said grille comprising a main frame and a subframe, said main frame having sides adapted to extend into and fit said opening to define a flow passage, pivot means for pivotally mounting said main frame on said panel for movement in one plane into and out from said opening, a first set of vanes on said main frame traversing said flow passage and one plane, said subframe being pivoted within said main frame on an axis in said one plane and including a second set of vanes traversing said flow passage and extending parallel with said one plane, a handle fixed to said subframe whereby said frames may be pivoted, and said sides being adapted to bridge the distance between said main frame and panel when said main frame is positioned to extend outwardly from said panel opening.

2. A grille such as set forth in claim 1, said main frame pivot means and handle being located adjacent opposite ends of said grille.

3. An adjustable grille, a panel with an opening therein, said grille comprising a main frame and a subframe, said main frame having sides resiliently engaging said panel and cooperating therewith to define a discharge passage from said opening, said main frame being pivoted at one end with respect to said panel for movement about one axis with respect to said opening while maintaining said discharge passage, vanes on said main frame extending parallel with said one axis and traversing said discharge passage, said subframe being pivoted on said main frame on a second axis and including vanes extending parallel with said second axis, detent means for retaining said main frame in a selected position with regard to said panel opening, and the sides of said main frame extending into said opening to serve as sealing means between said grille and panel when said grille is positioned to extend from said panel.

References Cited in the file of this patent
UNITED STATES PATENTS

| | | |
|---|---|---|
| 2,754,747 | Bertling | July 17, 1956 |

FOREIGN PATENTS

| | | |
|---|---|---|
| 252,463 | Germany | Oct. 22, 1912 |
| 1,093,916 | France | May 10, 1955 |